United States Patent
Endo et al.

(10) Patent No.: US 7,588,801 B2
(45) Date of Patent: Sep. 15, 2009

(54) CHROMIUM-FREE RUST INHIBITIVE TREATMENT METHOD FOR METAL PRODUCTS HAVING ZINC SURFACE AND METAL PRODUCTS TREATED THEREBY

(75) Inventors: Yasuhiko Endo, Yokohama (JP); Kengo Takase, Kasugai (JP); Shunjiro Watanabe, Aichi (JP); Shoichiro Adachi, Ogaki (JP)

(73) Assignee: Hoden Seimitsu Kako Kenkyusho Co., Ltd., Atsugi (JP)

( * ) Notice: Subject to any disclaimer, the term of this patent is extended or adjusted under 35 U.S.C. 154(b) by 0 days.

(21) Appl. No.: 11/956,020

(22) Filed: Dec. 13, 2007

(65) Prior Publication Data

US 2008/0102212 A1 May 1, 2008

Related U.S. Application Data

(62) Division of application No. 11/334,552, filed on Jan. 19, 2006, now abandoned.

(30) Foreign Application Priority Data

Jan. 24, 2005 (JP) .............................. 2005-014988

(51) Int. Cl.
*B05D 1/36* (2006.01)

(52) U.S. Cl. ................ 427/387; 427/388.1; 427/388.5; 427/409; 148/240; 148/243; 148/253; 148/256; 148/257

(58) Field of Classification Search ........................ None
See application file for complete search history.

(56) References Cited

U.S. PATENT DOCUMENTS

| 4,330,446 | A | | 5/1982 | Miyosawa et al. |
| 4,411,964 | A | | 10/1983 | Hara et al. |
| 5,077,332 | A | | 12/1991 | Blattler et al. |
| 5,221,370 | A | * | 6/1993 | Jo et al. .............. 148/250 |
| 5,780,530 | A | * | 7/1998 | Mizutani et al. ....... 523/209 |
| 6,241,830 | B1 | | 6/2001 | Shimakura et al. |
| 6,478,886 | B1 | | 11/2002 | Kunz et al. |
| 2003/0190492 | A1 | | 10/2003 | Wada et al. |
| 2003/0209290 | A1 | | 11/2003 | Heimann et al. |
| 2004/0054044 | A1 | | 3/2004 | Bittner et al. |
| 2004/0062873 | A1 | | 4/2004 | Jung et al. |
| 2005/0037227 | A1 | | 2/2005 | Endo et al. |
| 2005/0287376 | A1 | * | 12/2005 | Rochester ............... 428/450 |

FOREIGN PATENT DOCUMENTS

| DE | 100 14 035 A1 | 10/2001 |
| DE | 103 08 237 A1 | 9/2004 |
| JP | 61-023766 | 2/1986 |
| JP | 61-253381 | 11/1986 |
| JP | 05-001391 | 1/1993 |
| JP | 11-323569 | 11/1999 |
| JP | 2000-248367 A | 9/2000 |
| JP | 2001-064782 A | 3/2001 |
| JP | 2001-64782 A | 3/2001 |
| JP | 2001-81578 A | 3/2001 |
| JP | 2002-317279 A | 10/2002 |
| JP | 2003-073850 A | 3/2003 |
| JP | 2003-160759 A | 6/2003 |
| JP | 2003-253464 A | 9/2003 |

OTHER PUBLICATIONS

Partial machine translation of JP11—323569, Nov. 1999.*
Partial machine translation of JP 2003—160759, Jun. 2003.*
Extended European Search Report (May 2006).

* cited by examiner

*Primary Examiner*—Erma Cameron
(74) *Attorney, Agent, or Firm*—Sughrue Mion, PLLC

(57) ABSTRACT

Provided is a chromium-free surface treatment method which imparts practical rust inhibitive performance to a metal product having a zinc surface to which it was difficult to impart rust inhibitive performance of practical level. A conversion-coated film of zinc phosphate etc. is formed on the zinc surface of the metal product as pretreatment, and the silica-based film is formed by applying a chromium-free surface treatment agent which uses alcohol or mixture of water and alcohol as a solvent to the conversion-coated film. As a result, when an aqueous surface treatment agent containing alcohol is applied, it is possible to suppress the formation of white rusting for 72 hours or longer in the salt spray test.

6 Claims, No Drawings

CHROMIUM-FREE RUST INHIBITIVE TREATMENT METHOD FOR METAL PRODUCTS HAVING ZINC SURFACE AND METAL PRODUCTS TREATED THEREBY

This is a divisional of application Ser. No. 11/334,552, filed Jan. 19, 2006, claiming the benefit of Japanese Appln. No. 2005-014988, filed Jan. 24, 2005, the entire disclosure of said prior applications, application Ser. No. 11/334,552 and JP 2005-014988 are considered a part of the disclosure of the accompanying application and are hereby incorporated by reference.

BACKGROUND OF THE INVENTION

1. Field of the Invention

The present invention relates to a chromium-free rust inhibitive treatment method for metal products having a zinc surface such as galvanized products and metal products having a zinc surface, which are treated by the chromium-free rust inhibitive treatment. The zinc surface for the invention can be an alloyed zinc surface.

2. Description of the Related Art

Conversion coating is a process for forming stable compound layer on metal surfaces by chemical or electrochemical treatment, and JIS standard books describe that there are phosphate treatment, blackening treatment, chromate treatment, etc. The main purposes of the conversion coating of metal products are to improve their rust inhibitive performance, to improve their applicability of paint and to color their surfaces.

Conventionally, metal products having zinc surfaces, for example, surfaces of galvanized metal products are treated by conversion coating using an aqueous solution containing chromate, or conversion coating using an aqueous solution not containing chromate. Methods for imparting rust inhibitive performance by further coating the metal surfaces with a paint film containing an organic resin as a base component have come into widespread use.

Because of the toxicity and carcinogenicity of hexavalent chromium, policies of not using products containing hexavalent chromium have been first formulated in Europe and the development of surface treatment agents not containing chromic acid (chromate) component is being actively carried out. Although some chromium-free surface treatment methods have already been proposed in laid-open patent documents, at present, galvanized products treated by conversion coating using chromite (trivalent chromium) for rust inhibition have just entered the stage of practical use. However, in performing the chromite conversion coating, liquid control is not easy and the chromite conversion coating poses problems, because part of trivalent chromium component changes into hexavalent chromium, which must be excluded from waste water.

There has also been proposed a method which involves treating a metal product having a zinc surface, for example, a surface of a galvanized metal product by conversion coating and further forming a film on the surface with an aqueous surface treatment agent containing silica and others to improve rust inhibitive performance.

For example, the Japanese Patent Laid-Open No. 61-253381 discloses a method to improve rust inhibitive performance which involves blackening a galvanized surface by conversion coating, followed by coating the conversion coated surface by applying an aqueous solution of silicate or an aqueous solution of colloidal silica etc., and an improved rust inhibitive performance was able to be imparted. However, in galvanized steel sheets subjected to rust inhibitive treatment by the method, white rusting occurred in less than 48 hours in the salt spray test specified in the Japan Industrial Standard (JIS) and the rust inhibitive performance of the galvanized steel sheets was insufficient in practical use.

The Japanese Patent Laid-Open No. 2000-248367 discloses a case where a surface of a zinc-plated steel sheet was treated by phosphate conversion coating and a thin film was formed on the treated surface by use of an aqueous solution which contained an organic resin as a base component and also contained a thiocarbonyl-group-containing compound, a phosphate compound, fine-grained silica and a silane coupling agent in addition to the organic resin. Alternatively, a thin film was formed on the conversion coated surface by use of an aqueous solution which contained a vanadic acid compound, a thiocarbonyl-group-containing compound, a phosphate compound, fine-grained silica and a silane coupling agent in addition to the organic resin as a base component. The patent document describes that there was no change even after samples of the surface-treated galvanized steel sheet were kept in a salt spray test apparatus for 168 hours.

The Japanese Patent Laid-Open No. 2001-81578 discloses a pre-painted metal sheet which was obtained by treating a galvanized steel sheet with chromium-free conversion coating, applying a polyester-based primer paint (thickness: 4 to 25 μm) containing a chromium-free rust inhibitive pigment to the surface of the galvanized steel sheet and applying a topcoat paint, and exemplifies modified silica (Sealdex: a fine powder of silica made by Fuji Silysia Chemical Ltd.) as the chromium-free rust inhibitive pigment.

The Japanese Patent Laid-Open No. 2002-317279 discloses a steel sheet which was obtained by conversion coating a hot-dip alloy galvanized steel sheet (containing Al and Mg), and applying undercoat with an aqueous paint and further applying a topcoat. The conversion coating liquid used contained a titanium compound, such as hexafluorotitanic acid and titanium hydrofluoric acid, and a zirconia compound, such as hexafluorozirconic acid in addition to an aqueous resin, such as an acryl emulsion, and the patent document exemplifies an aqueous paint, as a primer paint, which contained an aqueous acryl emulsion and in which a silica-based rust inhibitive pigment (Sealdex) was dispersed. Then, an aqueous paint which contained an aqueous resin as a base component, such as an acryl emulsion, and in which a titanium dioxide pigment was dispersed, was applied as a topcoat paint. From examples of the patent document, rust inhibitive properties of primer painted sample sheets are not clear, since the evaluation was performed by the blistering of the coated films when the topcoated sample sheets were put in a salt spray test apparatus.

Also, the Japanese Patent Laid-Open No. 2003-253464 discloses a steel sheet which was obtained by treating commercially available galvanized steel sheets (an electrogalvanized steel sheet and a hot-dip galvanized steel sheet, these commercially available steel sheets are usually subjected to chromate treatment) with zinc phosphate type conversion coating, and applying a chromium-free film coating on the surfaces. The chromium-free film coating was formed by a slightly acidic aqueous solution containing a phenol-based aqueous organic resin, a titanium compound, such as titanium ammonium fluoride, or a zirconium compound, such as zirconium hydrofluoric acid, and a silane coupling agent, such as mercaptopropyl trimethoxylane. The patent document describes that when samples of the surface-treated galvanized steel sheet were put in a salt spray test apparatus for 72 hours, some samples did not cause white rusting.

The Japanese Patent Laid-Open No. 05-001391 discloses that rust inhibitive performance (white rusting resistance)

was improved by forming a film of a surface treatment agent containing alcohol and silica on a conversion coated galvanized surface. However, the film formed by applying the surface treatment agent contained a resin as a base component and it is hard to say that the film was siliceous. According to examples described in the patent document, all the films contained resin components including a curing agent resin such as melamine resin in amounts of not less than 51% by weight. Furthermore, the patent document describes only examples in which a surface treatment agent was applied to a galvanized and chromate treated surface.

The Japanese Patent Laid-Open No. 2001-64782 discloses that silica sol in ethanol solvent, which was obtained from ethanol solution of tetraethoxysilane through hydrolysis with water and hydrochloride acid, was used as a surface treatment agent. A hot-dip zinc alloy galvanized steel sheet, which was subjected to colorable conversion treatment before, was dipped in the surface treatment agent to form a siliceous coating on the steel sheet and then the coating was cured. The rust inhibitive performance of the surface treated steel sheet in a salt spray test is described in the patent document, that white rusting appeared on a sample of the surface treated steel sheet in 12 hours. The reason of the poor rust inhibitive performance is supposed that the surface treated steel sheet had a siliceous coating thinner than 0.3 μm since the used silica sol solution had silica component concentration less than 5% by weight.

The present inventors proposed in their previous patent application (the United States Patent Application Publication No. US 2005/0037227 A1) a chromium-free surface treatment agent which forms a siliceous film capable of suppressing the formation of red rusting for a long time when applied to a surface of a galvanized metal product. In the chromium-free surface treatment agent, a nano-sized powder of titanium dioxide subjected to dispersion treatment, which has an average particle size of primary particles of not more than 70 nm (preferably not more than 40 nm), was mixed in an effective amount.

Also, in the US Patent Application Publication, the present inventors proposed a surface treatment agent effective in suppressing the formation of white rusting. The surface treatment agent was an alcoholic solution which contained alkoxysilane oligomer having a specific weight averaged molecular weight as a base component.

That is, not only the formation of red rusting, but also the formation of white rusting can be suppressed for a long time by applying the surface treatment agent, which is an alcoholic solution containing alkoxysilane oligomer having a weight averaged molecular weight of 1000 to 10000 as a base component, to a surface of a galvanized product to coat the surface with a thin siliceous film of 1 to 3 in thickness. In the case, when the affinity of the surface treatment agent with the zinc plated condition of the substrate is good, the formation of white rusting can be suppressed for 300 hours or longer in the salt spray test.

It is preferred that non-VOC water be used as a solvent of the surface treatment agent. However, when a chromium-free surface treatment agent which uses only water as a solvent was applied to a surface of a galvanized product, the formation of white rusting occurred early even if the formation of red rusting can be suppressed for a long time (as described in the Japanese Patent Laid-Open No. 61-253381).

When the present inventors obtained from various manufacturers bolts which had been galvanized under various galvanizing conditions (without chromate treatment) and applied a surface treatment agent which was an alcoholic solution containing alkoxysilane oligomer as a base component, it was found that rust inhibitive performance varies greatly depending on galvanizing conditions.

Hence, the present inventors introduced a small-sized electric barrel galvanizing apparatus, prepared an alkaline zincate zinc plating bath, and tried to investigate the reason why rust inhibitive performance differs when a surface treatment agent is applied to galvanized bolts and screws. As a result, some cause-and-effect relationships were grasped, although the reason for the difference in rust inhibitive performance could not be clarified because of the very complex phenomena in a galvanizing bath to which a brightener is added. For example, it became apparent that when pickling which involves washing with diluted nitric acid, which is usually performed before chromate treatment, is performed, the rust inhibitive performance is impaired.

Also, it became apparent that when the current density of galvanizing is increased to complete galvanizing in a short time, the rust inhibitive performance deteriorates when a surface treatment agent is applied.

Furthermore, it became apparent that when small bolts or screws having an outside diameter of a threaded portion of not more than 3 mm are galvanized by use of a barrel plating apparatus, an expected level of rust inhibitive performance when a surface treatment agent is applied cannot be obtained to such small bolts or screws even when galvanizing is performed with an appropriate current density which is found beforehand.

SUMMARY OF THE INVENTION

An object of the present invention is to provide a surface treatment method which improves rust inhibitive performance against white rusting of metal products having a zinc surface, to which it was difficult to impart rust inhibitive performance of practical level by applying a chromium-free surface treatment agent which forms a siliceous film, for example, to galvanized metal products having poor affinity with the surface treatment agent.

Concretely, the present invention has as its object to provide a chromium-free surface treatment method which can suppress the formation of white rusting for 72 hours or longer, the duration being thought to be useful for practical use, in the salt spray test specified in JIS Z 2371 by subjecting a surface of a metal product having a zinc surface, to which it was difficult to impart rust inhibitive performance of useful level, to chromium-free surface treatment by applying a surface treatment agent which forms a siliceous film.

Furthermore, the present invention has another object to provide a chromium-free rust inhibitive treatment method which can impart a white rusting suppressing capability of practical level also to a galvanized metal product by applying an aqueous surface treatment agent.

The present inventors variously examined electric galvanizing conditions and every treatment condition subjected before and after galvanizing, and as a result, they found out a surface treatment method which improves the rust inhibitive performance of a metal product having a zinc surface by adding an operation before the application of a chromium-free surface treatment agent, and reached the present invention.

In a chromium-free rust inhibitive treatment method for metal products having a zinc surface according to the present invention, a conversion coated film is formed on a zinc surface by performing conversion coating with a chromium-free conversion coating liquid, and a siliceous film or a silica based film having an average thickness of 0.5 to 3 μm is formed by applying a chromium-free surface treatment agent which contains silica components or components that change into silica in an alcohol solvent or a mixed solvent of water and alcohol to a surface of the conversion coated film. It is preferred that the solution of the chromium-free surface treatment agent used in the present invention include 10 to 25% by weight of the silica components or the components that change into silica, as an amount converted to silica.

When a metal product having a zinc surface is subjected to surface treatment by applying a chromium-free rust inhibitive treatment method according to the present invention, the rust inhibitive performance in the salt spray test according to JIS Z 2371 is improved and it is possible to suppress the formation of white rusting for 72 hours or longer, the suppressed duration being considered to be practical.

In the chromium-free rust inhibitive treatment method for metal products having a zinc surface according to the present invention, it is preferred that the metal products having a zinc surface be galvanized metal products or zinc alloy plated metal products or cast zinc alloy products as a base metal.

In the chromium-free rust inhibitive treatment method for metal products having a zinc surface according to the present invention, a silica component is a colloidal silica, and a mixed solvent of water and alcohol is preferably used as the solvent.

In the chromium-free rust inhibitive treatment method for metal products having a zinc surface according to the present invention, a component that changes into silica is alkoxysilane oligomer, which is obtained by hydrolysis and condensation polymerization of an alkoxysilane monomer, in an alcohol solvent. It is preferred that the weight averaged molecular weight of the alkoxysilane oligomer be 1000 to 10000.

In the chromium-free rust inhibitive treatment method for metal products having a zinc surface according to the present invention, it is preferred that the solution of a chromium-free surface treatment agent contain an effective amount of a dispersed nano-sized powder of titanium dioxide which has an average size of primary particles of not more than 40 nm. The solution of a chromium-free surface treatment agent contains 0.3 to 2% by weight, preferably 0.5 to 1.5% by weight of a nano-sized powder of titanium dioxide.

In the chromium-free rust inhibitive treatment method for metal products having a zinc surface according to the present invention, it is preferred that the solution of a chromium-free surface treatment agent contain an effective amount of a silane coupling agent. The solution of a chromium-free surface treatment agent contains preferably 4 to 16% by weight, more preferably 6 to 14% by weight of a silane coupling agent.

In the chromium-free rust inhibitive treatment method for metal products having a zinc surface according to the present invention, an aqueous chromium-free conversion coating liquid containing zinc phosphate as a base component is preferably used. It is preferred that the aqueous chromium-free conversion coating liquid contain 0.5 g/liter to 5 g/liter of zinc ions and 2.0 g/liter to 20 g/liter of phosphoric acid ions.

In a metal product having a zinc surface subjected to the chromium-free rust inhibitive treatment of the present invention, a conversion coated film is formed on the zinc surface of the metal product and a surface of the conversion coated film is preferably coated with a siliceous film having a thickness of 0.5 to 3 µm which contains an effective amount of a nano-sized powder of titanium dioxide having an average primary particle size of not more than 40 nm. It is preferred that the siliceous film contain 2 to 10% by weight of a nano-sized powder of titanium dioxide and not less than 65% by weight of silica.

In a metal product having a zinc surface subjected to the chromium-free rust inhibitive treatment of the present invention, it is preferred that a conversion coated film which contains zinc phosphate as a base component be formed on the zinc surface.

In a metal product having a zinc surface subjected to another chromium-free rust inhibitive treatment of the present invention, a conversion coated film is formed on the zinc surface and a solution of a surface treatment agent which contains an alcoholic solution of alkoxysilane oligomer as a base component is applied to the surface, whereby the surface is coated with a siliceous film having a thickness of 0.5 to 3 µm.

In a metal product having a zinc surface subjected to the chromium-free rust inhibitive treatment of the present invention, it is preferred that the conversion coating liquid be an aqueous solution containing 0.5 to 5 g/liter of citric acid. Furthermore, it is preferred that the conversion coating liquid containing citric acid according to the present invention contain, in addition to the citric acid, 2 to 20 g/liter of aqueous silica sol, as an amount converted to silica, and 0.6 to 6 g/Liter of zinc ions.

In a metal product having a zinc surface subjected to the chromium-free rust inhibitive treatment of the present invention, the conversion coated film can have a dark color. That is, it is preferred that the conversion coated film have a brightness value of not more than 4 in the Munsell color system.

It is preferred that a metal product having a zinc surface subjected to the chromium-free rust inhibitive treatment of the present invention be a small screw having a threaded portion with an outside diameter of not more than 3 mm, which is electrogalvanized by the barrel method.

By appropriately applying the chromium-free rust inhibitive treatment method for metal products having a zinc surface according to the present invention, it is possible to suppress the formation of white rusting which occurs by the oxidation of the zinc on the zinc surface for a long time compared to a case where only a chromium-free surface treatment agent is applied. This effect is remarkable when the chromium-free rust inhibitive treatment method is used in a metal product having a zinc surface having an inferior rust inhibitive performance when a surface treatment agent is applied.

It has hitherto been difficult to prevent the formation of white rusting by the treatment with an aqueous chromium-free surface treatment agent. However, by using the chromium-free rust inhibitive treatment method of the present invention, i.e., by applying a surface treatment method which combines chromium-free conversion coating and a solution of an aqueous surface treatment agent containing a mixed solvent of water and alcohol, it is possible to suppress the formation of white rusting for 72 hours or longer, the suppressed duration being thought to be practical use.

Small galvanized screws have had a problem that the barrel plating electric current density is nonuniform among the screws and that the formation of white rusting cannot be suppressed for a long time even when an alcohol solution of a chromium-free surface treatment agent is applied. However, the effect that the formation of white rusting can be suppressed for a long time is obtained by using the chromium-free rust inhibitive treatment method of the present invention in which conversion coating is performed as pretreatment.

Also for diecast products of a zinc alloy which contains zinc as a base metal, the formation of white rusting can be suppressed for a long time by using the chromium-free rust inhibitive treatment of the present invention.

When a citric-acid-based conversion coating agent is used, it is possible to perform conversion coating without the formation of a frosted zinc surface and the time until the formation of white rusting can be extended by treating a zinc surface, which has been pickled in diluted nitric acid, with citric acid type conversion coating and then applying a surface treatment agent of an alcohol solvent.

As for galvanized steel sheet surface that is treated with zinc phosphate type conversion coating and a surface treatment agent of alcohol solvent, deterioration in rust inhibitive performance in the evaluation of the salt spray test decreases after the steel sheet is subjected to a light-exposure test. The light-exposure test is a method usually adopted for evaluating automotive interior parts in Japan. When zinc phosphate type conversion coating is performed as pre-treatment for the surface treatment, the surface-treated galvanized steel sheet well keeps its rust inhibitive performance even after the light-exposure test.

Furthermore, the yellow coloring, which happens by the baking treatment performed to avoid hydrogen embrittlement, can be removed by a citric-acid-based conversion coating treatment, and by applying a surface treatment agent of an alcohol solvent to the decolorized surface, and it is possible to suppress the formation of white rusting for 72 hours or longer, the suppressed duration being thought to be practical.

DETAILED DESCRIPTION OF THE PREFERRED EMBODIMENTS

The present inventors found out that when a surface of a metal product is treated with chromium-free conversion coating, preferably zinc phosphate type conversion coating, and a siliceous film is formed on the surface of the metal product by applying a solution of a surface treatment agent which uses an alcohol solvent or a mixed solvent of water and alcohol, the rust inhibitive performance against the formation of white rusting on the metal product having a zinc surface can be remarkably improved. The mixed solvent preferably contains alcohol components from 15 to 40% by weight.

In the present invention, a "siliceous film" means a film which contains silica ($SiO_2$) as a base component, preferably a film which contains not less than 65% by weight of silica.

If the affinity of a surface treatment agent for forming a siliceous film which uses an alcohol solvent or a mixed solvent of water and alcohol with a zinc surface to be treated is poor, white rusting occurs within 24 hours in the salt spray test based on JIS when the surface treatment agent is applied. However, when the zinc surface is treated with conversion coating beforehand, it is possible to extend the time until the formation of white rusting to 72 hours or longer in the salt spray test.

On the other hand, the thicker the zinc layer, the longer the time until the formation of red rusting in the salt spray test, which varies depending on conversion treatment conditions.

The surface of a metal product having a zinc surface can be treated with chromium-free conversion coating in accordance with specified procedures by use of a commercially available conversion coating agent. However, because there is a difference in the rust inhibitive performance of finished products depending on the kinds of conversion coating agents, it is preferable to select a chromium-free conversion coating agent which can positively improve rust inhibitive performance by conducting tests beforehand.

Among various kinds of chromium-free conversion coating, zinc phosphate type conversion coating can improve rust inhibitive performance stably. When a plated zinc surface is treated with conversion coating, the thickness of the plated zinc layer decreases and the formation of red rusting occurs early. Therefore, it is preferable not to form a thick conversion coated film. A zinc surface treated with zinc phosphate type conversion coating becomes frosted, and the adhesion with a film of a surface treatment agent is improved. Therefore, this is also considered to be one of the reasons why rust inhibitive performance is improved by conversion coating when a surface treatment agent is applied.

Some chromium-free conversion coating agents used in the treatment of zinc surfaces can change the color of a zinc surface from a dark color to black. Because the film formed by the surface treatment agent used in the present invention is clear and colorless, a color resulted from coloring with conversion coating can be used as it is as the color of a product. If conversion coating is used for coloring, the chromium-free rust inhibitive treatment method of the present invention can be a method for coloring a metal product having a zinc surface.

The greater part of metal products having a zinc surface is galvanized metal products, and galvanizing is classified as electro-galvanizing and hot-dip galvanizing. Furthermore, there is zinc alloy galvanizing to both of electro-galvanizing and hot-dip galvanizing. The chromium-free rust inhibitive treatment method of the present invention can be applied to cast zinc alloy products (including diecast products), which contains zinc as a base component.

The solution of a chromium-free surface treatment agent for forming a siliceous film utilizing an alcohol solvent preferably contains alkoxysilane oligomer having a weight averaged molecular weight of 1000 to 10000 as a component which changes into silica. If the weight averaged molecular weight of alkoxysilane oligomer is less than 1000, the rust inhibitive performance of a surface treatment agent decreases, and if the weight averaged molecular weight of alkoxysilane oligomer is more than 10000, the solution of a surface treatment agent becomes unstable and the gelation of the surface treatment agent is apt to occur. When gelation proceeds, the rust inhibitive performance of the surface treatment agent is impaired and the pot life of the surface treatment agent comes to an end.

In addition to an alcoholic solution of alkoxysilane oligomer having a weight averaged molecular weight of less than 1000, commercially available colloidal silica utilizing alcohol solvent can be used as a base component of a surface treatment agent which forms a siliceous film, though the rust inhibitive performance in this case is a little inferior.

Alkoxysilane oligomer having a weight averaged molecular weight of 1000 to 10000 is obtained, for example, by mixing water with a small amount of an acid catalyst, such as hydrochloric acid, nitric acid, sulfuric acid and acetic acid, which is dissolved into an alcoholic solution of tetraalkoxysilane, alkyl trialkoxysilane, etc. (which is preferably diluted with isopropyl alcohol etc. so that the silane compound to be converted to silica becomes a targeted concentration beforehand) so that the oligomer grows to a targeted weight averaged molecular weight, and by performing the hydrolysis and condensation polymerization of the alkoxysilane. This synthesis reaction is performed, for example, when the temperature is kept at a temperature between 30 to 40° C. while stirring the solution for 24 hours, condensation polymerization proceeds and alkoxysilane oligomer having a saturated weight averaged molecular weight is synthesized.

Instead of using a monomer of tetraethoxysilane etc. as a raw material for condensation polymerization, it is also possible to use a commercially available oligomer, in which tetraethoxysilane and the like are condensation-polymerized beforehand to a tetragomer or so, to obtain a targeted weight averaged molecular weight.

It is preferred that components which form a siliceous film are mixed in a solution of a surface treatment agent in amounts of 10 to 25% by weight as an amount converted to silica. It is preferred that in addition to an effective amount of a silane coupling agent, an effective amount of a nano-sized powder of titanium dioxide, which is previously subjected to dispersion treatment, having an average primary particle size of not more than 40 nm, be mixed in a solution of a surface treatment agent. It is preferable to select a silane coupling agent which does not become unstable when mixed with an alcoholic solution of alkoxysilane oligomer, and it is especially preferable to use a silane coupling agent having an epoxy functional group which hardly varies pH. A preferred amount of the silane coupling agent mixed in a solution of a surface treatment agent is in the range of 4 to 16% by weight. A preferred amount of the nano-sized powder of titanium dioxide is in the range of 0.3 to 2% by weight. If the amount of a mixed silane coupling agent is too small, rust inhibitive performance is inferior. If the mixed amount is too large, the cost of a surface treatment agent becomes high because a silane coupling agent is relatively expensive. This case applies also to a nano-sized powder of titanium dioxide. Furthermore, it is preferred that a resin which dissolves in alcohol, such as polyvinyl butyral, be mixed in amounts of 0.2 to 2% by weight in a solution of a surface treatment agent. The addition of a small amount of a resin component is effective in lowering the hardness of a formed film and improving the adhesion to the substrate. If the amount of a mixed resin is too large, a solution of a surface treatment agent becomes unstable and gelation is apt to occur. Furthermore, it is also preferable to add a small amount of a dispersant for preventing coagulation and settlement of a nano-sized powder of titanium dioxide dispersed in a solution of a surface treatment agent.

For a surface treatment agent which uses a mixed solvent of water and alcohol, a commercially available aqueous solution of colloidal silica can be used. As the alcohol, it is possible to use isopropyl alcohol, ethyl alcohol, methyl alcohol, butyl alcohol, etc. or mixture of them. However, because the pH of the aqueous solution of colloidal silica is adjusted to the alkali side or the acid side, there is a tendency toward gelation when the pH varies during mixing and hence it is necessary to select a colloidal silica solution in such a manner as to avoid gelation.

Compared to a solution of a surface treatment agent which uses water alone as a solvent, a chromium-free surface treatment agent for forming a siliceous film, which uses a mixed solvent of water and alcohol, is clearly improved in the rust inhibitive performance to suppress the formation of white rusting when the chromium-free surface treatment agent is applied to a galvanized surface which is pre-treated with chromium-free conversion coating. In a solution of a chromium-free aqueous surface treatment agent used in the present invention, it is necessary that at least 10% by weight of the solvent be alcohol, and the mixing ratio (weight ratio) of water to alcohol in the solvent is preferably 6:4 to 9:1, more preferably 7:3 to 8:2. Also in a solution of a surface treatment agent which uses water and alcohol as a mixed solvent, it is preferred that an effective amount of a nano-sized powder of titanium dioxide subjected to dispersion treatment, having an average primary particle size of not more than 40 nm, be mixed. It is more preferred that an effective amount of a silane coupling agent be mixed.

The amount of a nano-sized powder of titanium dioxide mixed into a solution of a surface treatment agent is preferably in the range of 0.3 to 2% by weight, more preferably in the range of 0.5 to 1.5% by weight. By mixing the nano-sized powder of titanium dioxide subjected to dispersion treatment, the effect of suppressing the formation of red rusting in the salt spray test for a long time is obtained. If the amount of a mixed nano-sized powder of titanium dioxide is large and dispersion is not complete, a siliceous film tends to be colored white and the cost of a surface treatment agent becomes high. In the case, it is preferred that the content of the nano-sized powder of titanium dioxide in the siliceous film be 2 to 10% by weight.

A commercially available nano-sized powder of titanium dioxide for photocatalysis can be used as the nano-sized powder of titanium dioxide for the present invention. However, because a commercially available nano-sized powder of titanium dioxide for photocatalysis is usually a powder which is composed of secondary particles which are aggregate of a large number of primary particles having average particle size of 10 to 40 nm, and dispersion treatment is necessary in order to improve the effect of rust inhibitive performance with a small added amount. In dispersion treatment, a slurry is prepared by mixing the commercially available nano-sized powder of titanium dioxide preferably with ethyl Cellosolve or a high boiling point alcohol, such as propylene glycol monomethyl ether and n-butyl alcohol, and the slurry is subjected to dispersion treatment. Using a bead mill with small zirconia media, and circulating the slurry through the bead mill best perform the dispersion treatment. It is not easy to shatter micron-sized secondary particles of titanium dioxide into nano-sized primary particles, and even after a slurry of the micron-sized secondary particles of titanium dioxide is subjected to dispersion treatment by use of a bead mill, the secondary particles having an average particle size of 100 nm level often remain. However, by performing dispersion treatment, it is possible to obtain the effect of a surface treatment agent to improve in rust inhibitive performance by the addition of a small amount of the nano-sized titanium dioxide powder.

A preferred amount of a silane coupling agent mixed in a solution of a surface treatment agent is in the range of 4 to 16% by weight. By mixing the silane coupling agent, it is possible to suppress gelation when alcohol and a slurry of a nano-sized powder of titanium dioxide are mixed with an aqueous solution of colloidal silica, and the pot life of the surface treatment agent can be extended. If the amount of a mixed silane coupling agent is too small, the effect of mixing the silane coupling agent is not obtained. If the mixed amount is too large, the cost of a surface treatment agent is high. A more preferred amount of the silane coupling agent mixed in a solution of a surface treatment agent is in the range of 6 to 14% by weight.

In the application of a surface treatment agent to a metal product having a zinc surface, it is preferable to adopt the dip spin coating method for small articles such as galvanized bolts and nuts. When the dip spin coating method cannot be adopted, various methods, such as the dip drain method, the spray method and the roll coater method, can be used. The application performed by the dip spin coating method can sufficiently improve rust inhibitive performance with one coat and one bake process. However, by repeating the application twice (two coat and two bake process), the whole zinc surface can be covered with a film of a surface treatment agent, and as a result, it is possible to reduce variations in rust inhibitive performance among metal products.

Because alcohol having a low molecular weight is apt to evaporate, a dry siliceous film can be formed by allowing a surface-treated metal product to stand in a room atmosphere. However, dew condensation may sometimes occur due to the latent heat of alcohol evaporating and, therefore, in order to avoid this, it is preferable to suppress evaporation by mixing a high boiling point alcohol. Preferably, the surface treatment agent applied to articles is baked at 90 to 150° C. for about 15 minutes. If the baking temperature is too low, rust inhibitive performance decreases. If the baking temperature is too high, the film of the surface treatment agent becomes apt to exfoliate.

The average thickness of a film of a chromium-free surface treatment agent formed on a zinc surface should be 0.5 to 3 μm. If the film thickness is smaller than 0.5 μm, rust inhibitive performance decreases. On the other hand, even if the film thickness is more than 3 μm, an improvement in rust inhibitive performance cannot be expected and a thick film tends to exfoliate. A more preferred average film thickness is in the range of 1 to 2 μm. The thickness of a film of the chromium-free surface treatment agent applied can be changed according to the level of rust inhibitive performance necessary for a metal product having a zinc surface.

When small bolts and screws having an outside diameter of not more than 3 mm are electrogalvanized by use of a barrel and a surface treatment agent is applied to the galvanized surfaces, rust inhibitive performance of an expected level is not obtained sometimes. The phenomenon is due to the non-uniform plating current flowing and a large-density plating current flowing through part of the surfaces of the many bolts and screws put in the barrel.

When the present inventors treated small galvanized bolts, to which rust inhibitive performance of expected level could not be imparted only by the application of the surface treatment agent, it was found that the present invention is useful. That is, by applying a chromium-free surface treatment agent which forms a siliceous film to the surface pre-treated with conversion coating, the rust inhibitive performance against white rusting is remarkably improved.

In the present invention, the evaluation of rust inhibitive performance is performed by the salt spray test method specified in JIS Z 2371. That is, the adopted method involves spraying salt water having a concentration of 5% by weight in a test apparatus, holding the temperature at 35° C. and observing the formation of white rusting and red rusting every 24 hours. Therefore, that white rusting does not occur for 72 hours or longer refers to a case where the formation of white rusting was recognized after 96 hours is elapsed. Because it is expected that there will be many applications where metal products can be used if the condition that white rusting does not occur in 72 hours or longer is met. And the condition that the formation of white rusting can be suppressed for 72 hours or longer is practical. If combinations of surface treatment conditions including plating conditions are appropriate, it is possible to provide metal products capable of suppressing the formation of white rusting for 144 hours or longer, and even for 288 hours or longer.

Rust inhibitive performance varies also depending on the thickness of a zinc plated layer in addition to whether combinations of surface treatment conditions are appropriate. For example, when a zinc plated layer is consumed by conversion coating and becomes thin, red rusting occurs early. For this reason, it is preferable to adjust a conversion coated film so that it does not exceed a necessary thickness. When a galvanized metal product subjected to surface treatment by a chromium-free rust inhibitive treatment method of the present invention is put in a salt spray test apparatus, red rusting usually occurs in 300 hours to 2000 hours.

Hereinafter, the present invention will be concretely described by use of embodiments. However, the present invention is not limited by the embodiments.

A solution of a chromium-free surface treatment agent used in the test was prepared by following the procedure given below. First, a slurry was obtained by mixing 5 parts by weight of ethyl Cellosolve with 1 part by weight of a nano-sized powder of titanium dioxide (Super Titania F-6 made by Showa Denko K.K., average particle size of primary particles: about 15 nm). This slurry was put in a ball mill and dispersion treatment was performed for 48 hours, whereby "Slurry 1" with a dispersed nano-sized powder of titanium dioxide was obtained. In the ball mill, a wide-mouthed polypropylene bottle having a capacity of 2 liters was used as a container, in which 5 kg of mixed balls consisting of equal amounts of zirconia balls having a diameter of 3 mm and 5 mm were put, and a slurry was put to the top surface level of the zirconia balls, and which was sealed. And the container was placed on a stand to rotate the container at about 60 RPM so that the wide-mouthed polypropylene bottle rotates longitudinally.

By a similar way, a slurry was obtained by mixing 5 parts by weight of Propylene glycol monomethyl ether (PGME) with 1 part by weight of a nano-sized powder of titanium dioxide (Tainock A-100 made by Taki Chemical Co., Ltd., average primary particle size: about 10 nm). Dispersion treatment was similarly performed in the ball mill for 48 hours, whereby "Slurry 2" with a dispersed nano-sized powder of titanium dioxide was obtained.

Also, a slurry was obtained by mixing 5 parts by weight of ion exchanged pure water with 1 part by weight of a nano-sized powder of titanium dioxide (Super Titania F-6). Dispersion treatment was similarly performed in the ball mill for 48 hours, whereby aqueous "Slurry 3" with a dispersed nano-sized powder of titanium dioxide was obtained. The chemical compositions of the Slurries 1, 2 and 3 with a dispersed nano-sized powder of titanium dioxide prepared here are collectively shown in TABLE 1.

TABLE 1

| | Slurry with dispersed nano-sized powder of titanium dioxide | | | | | |
|---|---|---|---|---|---|---|
| | 1 | | 2 | | 3 | |
| | | Mixed amount (parts by weight) | | Mixed amount (parts by weight) | | Mixed amount (parts by weight) |
| Titanium dioxide (Average primary | Super Titania F-6 | 1 | Tainock A-100 | 1 | Super Titania F-6 | 1 |

TABLE 1-continued

| | Slurry with dispersed nano-sized powder of titanium dioxide | | | | | |
|---|---|---|---|---|---|---|
| | 1 | | 2 | | 3 | |
| | | Mixed amount (parts by weight) | | Mixed amount (parts by weight) | | Mixed amount (parts by weight) |
| particle size) | (15 nm) | | (10 nm) | | (15 nm) | |
| Solvent | Ethyl Cellosolve | 5 | PGME | 5 | Water | 5 |

PGME: Propylene glycol monomethyl ether

Next, a small amount of hydrochloric acid and water were added to a diluted isopropyl alcohol diluted solution of tetraethoxysilane, and while the temperature was held at 35° C. and the mixture was being stirred, hydrolysis and condensation polymerization reactions were caused to occur for 24 hours, whereby alkoxysilane oligomer (concentration converted to silica: about 20% by weight, pH: about 3.5) having a weight averaged molecular weight of about 2200 was synthesized. The weight averaged molecular weight was measured by use of a gel-permeation chromatograph (made by Tosoh Corporation, Type HLC-8120GPC) by using a polystyrene standard resin and tetrahydrofuran as a solvent.

Five parts by weight of a silane coupling agent having an epoxy functional group (TSL8350 made by GE Toshiba Silicones, concentration converted to silica: about 25% by weight), 5 parts by weight of an ethyl Cellosolve solution having a concentration of 10% by weight of polyvinyl butyral (S-LEC BM-1 made by Sekisui Chemical Co., Ltd.), 5 parts by weight of ethyl Cellosolve, 5 parts by weight of isopropyl alcohol and 6 parts by weight of Slurry 1 with a dispersed nano-sized powder of titanium dioxide were mixed with 65 parts by weight of the synthesized alkoxysilane oligomer, whereby "Solution 1" of a chromium-free surface treatment agent which has an alcohol solvent was obtained.

Also, 10 parts by weight of a silane coupling agent (TSL8350 made by GE Toshiba Silicones), 10 parts by weight of isopropyl alcohol and 6 parts by weight of Slurry 2 with a dispersed nano-sized powder of titanium dioxide were mixed with 60 parts by weight of an aqueous solution of colloidal silica (Snowtex XS made by Nissan Chemical Industries, Ltd., average particle size of colloidal silica particles: about 5 nm, pH: about 11, content of silica components: about 20% by weight) and 0.05 part by weight of Dynol 604 (made by Nisshin Chemical Industry, Co., Ltd.) was added to the mixture as a wetting agent which serves also as an antifoaming agent, whereby "Solution 2" of a chromium-free surface treatment agent which has alcohol and water as a solvent was obtained.

Furthermore, 8 parts by weight of a silane coupling agent having an epoxy group (TSL8350 made by GE Toshiba Silicones) and 6 parts by weight of aqueous Slurry 3 with a dispersed nano-sized powder of titanium dioxide were mixed with 72 parts by weight of an aqueous solution of colloidal silica (Snowtex XS made by Nissan Chemical Industries, Ltd.) and 0.06 part by weight of Dynol 604 (made by Nisshin Chemical Industry, Co., Ltd.) was added to the mixture, whereby "Solution 3" of a chromium-free surface treatment agent which has water as a solvent was obtained.

Furthermore, 123 parts by weight of the same alkoxysilane oligomer having a weight averaged molecular weight of 2200 as used in Solution 1 of a chromium-free surface treatment agent, 9 parts by weight of an isopropyl alcohol solution having a concentration of 10% by weight of polyvinyl butyral (BL-1 made by Sekisui Chemical Co., Ltd.), 14.7 parts by weight of a silica sol solution which uses an isopropyl alcohol solvent (IPA-ST made by Nissan Chemical Industries, Ltd., content of silica components: about 30% by weight), 17.1 parts by weight of ethyl Cellosolve and 14.6 parts by weight of isopropyl alcohol were mixed, whereby "Solution 4" of a chromium-free surface treatment agent which has an alcohol solvent was prepared. The mixed compositions of the Solutions 1, 2, 3 and 4 of chromium-free surface treatment agents prepared here are collectively shown in TABLE 2.

TABLE 2

| | Solution of Chromium-free surface treatment agent | | | |
|---|---|---|---|---|
| | 1 | 2 | 3 | 4 |
| Alkoxysilane oligomer | 65 parts by weight | | | 123 parts by weight |
| Aqueous solution of colloidal silica | | 60 parts by weight | 72 parts by weight | |
| Isopropyl alcohol solution of silica sol | | | | 14.7 parts by weight |
| Silane coupling agent | 5 parts by weight | 10 parts by weight | 8 parts by weight | |
| Ethyl Cellosolve solution of polyvinyl butyral (10% by weight) | 5 parts by weight | | | |
| Isopropyl alcohol solution of polyvinyl butyral | | | | 9 parts by weight |

TABLE 2-continued

| | | Solution of Chromium-free surface treatment agent | | | |
|---|---|---|---|---|---|
| | | 1 | 2 | 3 | 4 |
| (10% by weight) Ethyl Cellosolve | | 5 parts by weight | | | 17.1 parts by weight |
| Isopropyl alcohol | | 5 parts by weight | 10 parts by weight | | 14.6 parts by weight |
| Slurry with dispersed nano-sized powder of titanium dioxide | 1 | 6 parts by weight | | | |
| | 2 | | 6 parts by weight | | |
| | 3 | | | 6 parts by weight | |
| Dynol 604 | | | 0.05 parts by weight | 0.06 parts by weight | |
| Total | | 91 parts by weight | 86.05 parts by weight | 86.06 parts by weight | 178.4 parts by weight |
| Remarks | Silica components | 15.7% by weight | 16.9% by weight | 19.1% by weight | 16.3% by weight |
| | Titanium dioxide | 1.1% by weight | 1.2% by weight | 1.2% by weight | |
| | Silane coupling agent | 5.5% by weight | 11.6% by weight | 9.3% by weight | |
| | Solvent (Balance) | Alcohol | Mixture of water and alcohol | Water | Alcohol |

Note:
The content of silica components is expressed in the percentage by weight of the total amount of silica components contained in alkoxysilane oligomer (silica component: about 20% by weight), an aqueous solution of colloidal silica (silica component: about 20% by weight), a silica sol alcohol solution (silica component: about 30% by weight) and a silane coupling agent (silica component: about 25% by weight), which are added to a solution of chromium-free surface treatment agent, to the weight of the solution.

Next, conversion coating liquids for test were prepared. "Chromium-free conversion coating liquid 1" was obtained by mixing zinc phosphate tertahydrate, a hydrate of basic nickel (II) carbonate, magnesium phosphate, 85% by weight phosphoric acid, 60% by weight nitric acid, sodium nitrite and ion exchanged pure water were mixed so that the Chromium-free conversion coating liquid 1 is essentially composed of 1.0 g/liter of zinc, 0.05 g/liter of nickel, 1.0 gaiter of magnesium, 4.0 g/liter of phosphoric ions, 2.5 g/liter of nitrate ions, 0.05 g/liter of nitrite ions and the balance of water.

Also, "Chromium-free conversion coating liquid 2" was obtained by mixing zinc phosphate tertahydrate, magnesium phosphate, 85% by weight phosphoric acid, 60% by weight nitric acid, sodium nitrite, hydrofluoric acid and ion exchanged pure water were mixed so that the Chromium-free conversion coating liquid 2 is essentially composed of 0.8 g/liter of zinc, 2.0 g/liter of magnesium, 8.0 g/liter of phosphoric ions, 4.0 g/liter of nitrate ions, 0.05 g/liter of nitrite ions, 0.01 g/liter of fluorine and the balance of water.

In addition, a zinc phosphate conversion coating liquid made by Chemicoat Inc. (Chemicoat No. 422, referred to as "Chromium-free conversion coating liquid 3") and Chemicron S-2 which is a surface regulator (a pretreatment agent made by Chemicoat Inc., including titania sol) were prepared. The chemical compositions of the Chromium-free conversion coating liquids 1, 2 and 3 are collectively shown in TABLE 3.

TABLE 3

| | Chromium-free conversion coating liquid | | |
|---|---|---|---|
| | 1 | 2 | 3 |
| $Zn^{2+}$ | 1.0 g/l | 0.8 g/l | Chemicoat No. 422 |
| $Ni^{2+}$ | 0.05 g/l | | |
| $Mg^{2+}$ | 1.0 g/l | 2.0 g/l | |
| $PO_4^{3-}$ | 4.0 g/l | 8.0 g/l | |
| $NO_3^-$ | 2.5 g/l | 4.0 g/l | |
| $NO_2^-$ | 0.05 g/l | 0.05 g/l | |
| $F^-$ | | 0.01 g/l | |
| Water | Balance | Balance | |

The application of a solution of a chromium-free surface treatment agent to a surface of a metal product having a zinc surface was performed by the dip spin coating method. That is, the application method adopted is such that as-galvanized bolts (without chromate treatment) were wetted by dipping in a solution of a surface treatment agent, taken out of the solution, and transferred into a stainless steel cage attached to a centrifugal machine, and rotated for about 4 seconds at about 500 RPM with a radius of rotation of about 15 cm, whereby an excess solution of a surface treatment agent adhering to the surfaces of the bolts etc. was shaken off.

The evaluation of rust inhibitive performance was performed by use of a salt spray test apparatus in accordance with JIS Z 2371 and the formation of white rusting and red rusting of three samples was checked respectively by observing the surfaces of samples (washed by a water shower) with naked eyes at intervals of 24 hours. The rust inhibitive performance of each sample was recorded and evaluated by the time lapsed until the formation of white rusting and red rusting to two of the three.

EXAMPLE 1 AND COMPARATIVE EXAMPLE 1

Three galvanized bolts (M8, half screwed, length of threaded portion: about 20 mm), which had been galvanized in an acid zinc chloride bath by Company A in an as-galvanized condition (without chromate treatment), were immersed in Chemicron S-2, which is a pretreatment agent, for 30 seconds and then immersed in Chromium-free conversion coating liquid 3 held at 60° C. for 30 seconds, whereby the zinc surface was treated with zinc phosphate type conversion coating, which was followed by rinsing and drying. The surfaces of these galvanized bolts became frosted due to the conversion coating and the luster of the zinc surface had been vanished. Solution 1 of a chromium-free surface treatment agent was applied to the galvanized bolts, which had been previously treated with the conversion coating, by the above-described dip spin coating method. Putting them in a baking furnace, the temperature was raised to 150° C. after holding at 80° C. for 10 minutes, and they were baked at 150° C. for 20 minutes (EXAMPLE 1).

Separately, Solution 1 of a chromium-free surface treatment agent which uses an alcohol solvent was applied to three as-galvanized bolts, which had been galvanized in the acid zinc chloride bath by Company A by the dip spin coating method. Putting them in a baking furnace, the temperature was raised to 150° C. and held at the temperature for 20 minutes to bake them after holding at 80° C. for 10 minutes (COMPARATIVE EXAMPLE 1).

The galvanized bolts of EXAMPLE 1 and COMPARATIVE EXAMPLE 1 which had been subjected to chromium-free surface treatment were put in the salt spray test apparatus based on JIS Z 2371 and their rust inhibitive performance was evaluated. As a result, on the galvanized bolts of EXAMPLE 1 subjected to chromium-free surface treatment, white rusting occurred in 192 hours and red rusting occurred in 672 hours. On the other hand, on the galvanized bolts of COMPARATIVE EXAMPLE 1 subjected to the surface treatment, white rusting occurred in 48 hours and red rusting occurred in 600 hours. That is, it is apparent from the comparison of EXAMPLE 1 with COMPARATIVE EXAMPLE 1 that even in galvanized bolts having poor affinity with the chromium-free surface treatment agent (rust inhibitive performance is poor when Solution 1 of a chromium-free surface treatment agent is applied), the rust inhibitive performance against the formation of white rusting is remarkably improved by applying the surface treatment agent after treating with zinc phosphate type conversion coating.

EXAMPLE 2 AND COMPARATIVE EXAMPLE 2

In the same manner as in EXAMPLE 1, three galvanized bolts (M8, half screwed, length of threaded portion: about 20 mm), which had been galvanized in a zinc cyanide bath by the same Company A, in an as-galvanized condition (without chromate treatment) were immersed in Chemicron S-2, which is a pretreatment agent, for 30 seconds in the same manner as in EXAMPLE 1 and then immersed in Chromium-free conversion coating liquid 3 held at 60° C. for 30 seconds, which was followed by rinsing and drying. The surfaces of these galvanized bolts became frosted due to the conversion coating. Solution 1 of a chromium-free surface treatment agent was applied to the conversion-coated bolts by the dip spin method. Putting them in a baking furnace, the temperature was held at 80° C. for 10 minutes and then raised to 150° C. and they were baked at 150° C. for 20 minutes (EXAMPLE 2).

Next, in the same manner as in COMPARATIVE EXAMPLE 1, Solution 1 of a chromium-free surface treatment agent which uses an alcohol solvent was applied by the dip spin coating method to three as-galvanized bolts (without chromate treatment) which had been galvanized in the zinc cyanide bath by the same Company A, and have a bad affinity with a non-chromium surface treatment agent. Putting them in a baking furnace, the temperature was held at 80° C. for 10 minutes to dry them and then raised to 150° C., and held at 150° C. for 20 minutes to bake them (COMPARATIVE EXAMPLE 2). The galvanized bolts of EXAMPLE 2 and COMPARATIVE EXAMPLE 2 which had been subjected to chromium-free surface treatment were put in the salt spray test apparatus based on JIS Z 2371 and their rust inhibitive performance was evaluated. As a result, on the galvanized bolts of EXAMPLE 2 subjected to conversion coating and chromium-surface treatment, white rusting occurred in 192 hours and red rusting occurred in 624 hours. By contrast, on the galvanized bolts of COMPARATIVE EXAMPLE 2, white rusting occurred in 48 hours and red rusting occurred in 648 hours.

EXAMPLES 3 AND 4

Three as-galvanized bolts which had been galvanized in the acid zinc chloride bath by Company A (the same as-galvanized bolts as in EXAMPLE 1) and three as-galvanized bolts which had been galvanized in the zinc cyanide bath by Company A (the same as-galvanized bolts as in EXAMPLE 2) were immersed in Chemicron S-2, which is a pretreatment agent, for 30 seconds and then treated with conversion coating in Chromium-free conversion coating liquid 1 held at 60° C. for 30 seconds (all of these galvanized bolts changed blackish in their color). Next, Solution 1 of a chromium-free surface treatment agent was applied to these galvanized bolts which had been treated with by conversion coating. Putting them in a baking furnace, the temperature was held at 80° C. for 10 minutes and then raised to 150° C. The temperature was held at 150° C. for 20 minutes to bake the bolts. And, bolts of EXAMPLE 3 and EXAMPLE 4 subjected to chromium-free surface treatment were obtained from those galvanized in the acid zinc chloride bath and galvanized in the zinc cyanide bath, respectively. The surface-treated bolts of EXAMPLE 3 and EXAMPLE 4 were put in the salt spray test apparatus and their rust inhibitive performance was evaluated. As a result, on the bolts of EXAMPLE 3, white rusting occurred in 148 hours and red rusting occurred in 576 hours, and on the bolts of EXAMPLE 4, white rusting occurred in 148 hours and red rusting occurred in 648 hours.

EXAMPLE 5 AND COMPARATIVE EXAMPLE 3

Three as-galvanized bolts, which had been galvanized in an acid zinc chloride bath by Company B, (which have a relatively good affinity with the surface treatment agent) were immersed in Chemicron S-2 (a pretreatment agent) for 30 seconds and then immersed in Chromium-free conversion coating liquid 2 held at 60° C. for 30 seconds, whereby treatment with phosphoric acid type conversion coating was performed (at this time, the galvanized surfaces became frosted). Next, in the same manner as in EXAMPLE 1, Solution 1 of a chromium-free surface treatment agent was applied and surface-treated bolts of EXAMPLE 5 were obtained. Separately, in the same manner as in COMPARATIVE EXAMPLE 1, Solution 1 of a chromium-free surface treatment agent was applied to three as-galvanized bolts which had been galvanized in the acid zinc chloride bath by Company B, whereby surface-treated bolts of COMPARATIVE EXAMPLE 3 were obtained in the same manner as in EXAMPLE 1. All of these surface-treated bolts of EXAMPLE 5 and COMPARATIVE EXAMPLE 3 were put in the salt spray test apparatus and their rust inhibitive performance was investigated. As a result, on the bolts of EXAMPLE 5, white rusting occurred in 260 hours and red rusting occurred in 1680 hours. On the other hand, on the bolts of COMPARATIVE EXAMPLE 3, white rusting occurred in 192 hours and red rusting occurred in 1704 hours.

EXAMPLE 6 AND COMPARATIVE EXAMPLE 4

Three as-galvanized bolts, which had been galvanized in an alkaline zincate bath by Company C, (M8 half-screwed, which have a relatively good affinity with the surface treatment agent) were immersed in Chemicron S-2 for 30 seconds and then immersed in Chromium-free conversion coating liquid 3 held at 60° C. for 30 seconds, whereby treatment with phosphoric acid type conversion coating was performed (at this time, the galvanized surfaces lost the metallic luster of zinc and became frosted). Next, in the same manner as in EXAMPLE 1, Solution 1 of a chromium-free surface treatment agent was applied on the conversion-treated bolts and galvanized bolts of EXAMPLE 6 were obtained. Separately, in the same manner as in COMPARATIVE EXAMPLE 1, Solution 1 of a chromium-free surface treatment agent was applied to three as-galvanized bolts which had been galvanized in the alkaline zincate bath by Company C, whereby as-galvanized bolts of COMPARATIVE EXAMPLE 4 subjected to the surface treatment were obtained. All of these galvanized bolts of EXAMPLE 6 and COMPARATIVE EXAMPLE 4 were put in the salt spray test apparatus and their rust inhibitive performance was investigated. As a result, on the bolts of EXAMPLE 6, white rusting occurred in 240 hours and red rusting occurred in 1200 hours. On the other hand, on the surface-treated as-galvanized bolts of COMPARATIVE EXAMPLE 4, white rusting occurred in 168 hours and red rusting occurred in 1704 hours.

EXAMPLE 7 AND COMPARATIVE EXAMPLE 5

An alkaline zincate galvanizing bath manufactured by Dipsol Chemicals Co., Ltd. was prepared in a small barrel plating apparatus having a barrel capacity of about 2.9 liters. Subsequently, eighty M8 half screwed bolts (length of screwed portion: about 20 mm), (total weight: about 1.7 kg) previously subjected to pickling and alkali degreasing treatment were put in the barrel, a plating condition was set so that the average current density became 0.8 to 1.0 A/dm$^2$, and the plating current was applied for about 30 minutes while the barrel immersed in the plating bath was kept to rotate at 9 RPM, whereby zinc plating was performed to the bolt surfaces in an average thickness of about 10 μm. Out of these 80 galvanized bolts, which had been rinsed without washing (pickling) with diluted nitric acid, three galvanized bolts were immersed in Chemicron S-2 for 30 seconds and then immersed in Chromium-free conversion coating liquid 3 held at 60° C. for 30 seconds, whereby treatment with phosphoric acid type conversion coating was performed (at this time, the galvanized surfaces lost the metallic luster of zinc and became frosted). After rising and drying, in the same manner as in EXAMPLE 1, Solution 1 of a chromium-free surface treatment agent was applied to conversion-coated bolts, whereby surface-treated bolts of EXAMPLE 7 were obtained. Also, in the same manner as in COMPARATIVE EXAMPLE 1, Solution 1 of a chromium-free surface treatment agent was applied to three as-galvanized bolts of the same lot, whereby the surface-treated as-galvanized bolts of COMPARATIVE EXAMPLE 5 were obtained.

All of these surface-treated bolts of EXAMPLE 7 and COMPARATIVE EXAMPLE 5 were put in the salt spray test apparatus and their rust inhibitive performance was investigated. As a result, on the surface-treated bolts of EXAMPLE 7, white rusting occurred in 216 hours and red rusting occurred in 1104 hours. On the other hand, on the surface-treated as-galvanized bolts of COMPARATIVE EXAMPLE 5, white rusting occurred in 192 hours and red rusting occurred in 1128 hours.

EXAMPLE 8 AND COMPARATIVE EXAMPLE 6

An alkaline zincate galvanizing bath manufactured by Dipsol Chemicals Co., Ltd. was prepared in a small barrel plating apparatus having a capacity of about 1.6 liters, and about 300 g of small screws of M2.5 were put in the barrel, and the small screws were galvanized. The plating conditions were set so that the average current density became 1.0 A/dm$^2$, and the plating current was applied for about 22 minutes while the barrel immersed in the plating bath was kept to rotate at 10 RPM, whereby zinc plating was applied to the small-screw surfaces in an average thickness of about 7 μm.

Out of these small screws of about 300 g, three small as-galvanized screws were immersed in Chemicron S-2 for 30 seconds and then immersed in Chromium-free conversion coating liquid 3 held at 60° C. for 30 seconds, whereby treatment with phosphoric acid type conversion coating was performed (at this time, the galvanized surfaces lost the metallic luster of zinc and became frosted). After rising and drying, in the same manner as in EXAMPLE 1, Solution 1 of a chromium-free surface treatment agent was applied, whereby small surface-treated screws of EXAMPLE 8 were obtained. Also, in the same manner as in COMPARATIVE EXAMPLE 1, Solution 1 of a chromium-free surface treatment agent was applied to three small as-galvanized screws of the same lot, whereby small surface-treated screws of COMPARATIVE EXAMPLE 6 were obtained.

All of these small surface-treated screws of EXAMPLE 8 and COMPARATIVE EXAMPLE 6 were put in the salt spray test apparatus and their rust inhibitive performance was investigated. As a result, on the small surface-treated screws of EXAMPLE 8, white rusting occurred in 168 hours and red rusting occurred in 504 hours. On the other hand, on the small as-galvanized screws of COMPARATIVE EXAMPLE 6 subjected to chromium-free surface treatment, white rusting occurred in 124 hours and red rusting occurred in 552 hours.

EXAMPLE 9 AND COMPARATIVE EXAMPLE 7

Three small screws of M2 which had been galvanized in an acid zinc chloride bath by Company D (length of screwed portion: 3 mm) were immersed in Chemicron S-2 for 30 seconds and then immersed in Chromium-free conversion coating liquid 3 held at 60° C. for 30 seconds, whereby treatment with conversion coating was performed (at this time, the galvanized surfaces became frosted). In the same manner as in EXAMPLE 1, Solution 1 of a chromium-free surface treatment agent was applied to the surfaces of the conversion-treated bolts and baked, whereby small surface-treated screws of EXAMPLE 9 were obtained. Separately, in the same manner as in COMPARATIVE EXAMPLE 1, Solution 1 of a chromium-free surface treatment agent was applied to three small as-galvanized screws of M2 which had been galvanized in the acid zinc chloride bath by Company D, whereby small surface-treated as-galvanized screws of COMPARATIVE EXAMPLE 7 were obtained. All of these small surface-treated screws of EXAMPLE 9 and COMPARATIVE EXAMPLE 7 were put in the salt spray test apparatus and their rust inhibitive performance was investigated. As a result, on the small surface-treated screws of EXAMPLE 9, white rusting occurred in 168 hours and red rusting occurred in 216 hours. On the other hand, on the small as-galvanized screws of COMPARATIVE EXAMPLE 7 subjected to chromium-free surface treatment, white rusting occurred in 24 hours and red rusting occurred in 144 hours.

EXAMPLE 10 AND COMPARATIVE EXAMPLE 8

Three as-galvanized bolts, which had been galvanized in the alkaline zincate bath by Company C, (the same bolts as tested in EXAMPLE 6) were immersed in Chemicron S-2 for 30 seconds and then immersed in Chromium-free conversion coating liquid 3 held at 60° C. for 30 seconds, whereby zinc phosphate type conversion coating was performed (at this time, the galvanized surfaces lost the metallic luster of zinc and became frosted). After rising and drying, in the same manner as in EXAMPLE 1, Solution 2 of a chromium-free surface treatment agent which uses a mixed solvent of water and alcohol was applied to the conversion-coated bolts, whereby surface-treated bolts of EXAMPLE 10 were obtained. Separately, in the same manner as in COMPARATIVE EXAMPLE 1, Solution 2 of a chromium-free surface treatment agent was applied to three as-galvanized bolts which had been galvanized in the alkaline zincate bath by Company C, whereby surface-treated as-galvanized bolts of COMPARATIVE EXAMPLE 8 were obtained. All of these bolts of EXAMPLE 10 and COMPARATIVE EXAMPLE 8 were put in the salt spray test apparatus and their rust inhibitive performance was investigated. As a result, on the surface-treated bolts of EXAMPLE 10, white rusting occurred in 120 hours and red rusting occurred in 1176 hours. On the other hand, on the as-galvanized bolts of COMPARATIVE EXAMPLE 8 subjected to chromium-free surface treatment, white rusting occurred in 24 hours and red rusting occurred in 1200 hours.

COMPARATIVE EXAMPLES 9 AND 10

Three as-galvanized bolts (M8, half screwed) which had been galvanized in the alkaline zincate bath by Company C were immersed in Chemicron S-2 for 30 seconds and then immersed in Chromium-free conversion coating liquid 3 held at 60° C. for 30 seconds, whereby zinc phosphate type conversion coating was performed (at this time, the galvanized surfaces lost the metallic luster of zinc and became frosted). Next, in the same manner as in EXAMPLE 1, Solution 3 of a chromium-free surface treatment agent having water as a solvent was applied to the conversion-coated bolts, whereby surface-treated bolts of COMPARATIVE EXAMPLE 9 were obtained. Separately, in the same manner as in COMPARATIVE EXAMPLE 1, Solution 3 of a chromium-free surface treatment agent was applied to three as-galvanized bolts of the same lot as COMPARATIVE EXAMPLE 9, whereby as-galvanized bolts of COMPARATIVE EXAMPLE 10 subjected to the surface treatment were obtained. All of these bolts of COMPARATIVE EXAMPLE 9 and COMPARATIVE EXAMPLE 10 were put in the salt spray test apparatus and their rust inhibitive performance was investigated. As a result, on the surface-treated bolts of COMPARATIVE EXAMPLE 9, white rusting occurred in 24 hours and red rusting occurred in 1128 hours. On the other hand, on the surface-treated as-galvanized bolts of COMPARATIVE EXAMPLE 10, white rusting occurred in 24 hours and red rusting occurred in 1152 hours.

EXAMPLE 11 AND COMPARATIVE EXAMPLE 11

Three diecast zinc alloy parts (diameter: about 10 mm, inside diameter: 6 mm, length: about 15 mm) were immersed in Chemicron S-2 for 30 seconds after degreasing treatment and then immersed in Chromium-free conversion coating liquid 3 held at 60° C. for 30 seconds, whereby the zinc surfaces were treated with zinc phosphate type conversion coating (at this time, the surfaces became frosted). Next, Solution 1 of a chromium-free surface treatment agent was applied to the conversion-coated parts in the same manner as in EXAMPLE 1, whereby surface-treated diecast zinc alloy parts of EXAMPLE 11 were obtained. Separately, Solution 1 of a chromium-free surface treatment agent was applied to three diecast zinc alloy parts without conversion coating of the same lot in the same manner as in COMPARATIVE EXAMPLE 1, whereby surface-treated diecast zinc alloy parts without conversion coating of COMPARATIVE EXAMPLE 11 were obtained.

All of these surface-treated diecast zinc alloy parts of EXAMPLE 11 and COMPARATIVE EXAMPLE 11 were put in the salt spray test apparatus and their rust inhibitive performance was investigated. As a result, on the surface-treated diecast zinc alloy parts of EXAMPLE 11, white rusting occurred in 432 hours (red rusting did not occur because the material is zinc). On the other hand, on the surface-treated diecast zinc alloy parts without conversion coating of COMPARATIVE EXAMPLE 11, white rusting occurred in 192 hours.

EXAMPLES 1 to 11 and COMPARATIVE EXAMPLES 1 to 11 described above are collectively shown in TABLE 4.

TABLE 4

| | Test piece | Galvanizing bath | Plating thickness | Pre-treatment | Chromium-free conversion coating liquid | Appearance | Solution of chromium-free surface treatment agent | Time to rusting in SST | |
|---|---|---|---|---|---|---|---|---|---|
| | | | | | | | | White rusting (hours) | Red rusting (hours) |
| Example 1 | M8, half screwed | Acid zinc chloride bath (Company A) | 8 μm | With | 3 | Frosted | 1 (alcohol-based) | 192 | 672 |
| Comparative Example 1 | M8, half screwed | Acid zinc chloride bath (Company A) | 8 μm | Without | | | 1 (alcohol-based) | 48 | 600 |

TABLE 4-continued

| | Test piece | Galvanizing bath | Plating thickness | Pre-treatment | Chromium-free conversion coating liquid | Appearance | Solution of chromium-free surface treatment agent | Time to rusting in SST White rusting (hours) | Time to rusting in SST Red rusting (hours) |
|---|---|---|---|---|---|---|---|---|---|
| Example 2 | M8, half screwed | Zinc cyanide bath (Company A) | 9 μm | With | 3 | Frosted | 1 (alcohol-based) | 192 | 624 |
| Comparative Example 2 | M8, half screwed | Zinc cyanide bath (Company A) | 9 μm | Without | | | 1 (alcohol-based) | 48 | 648 |
| Example 3 | M8, half screwed | Acid zinc chloride bath (Company A) | 8 μm | With | 1 | Dark color | 1 (alcohol-based) | 148 | 576 |
| Example 4 | M8, half screwed | Zinc cyanide bath (Company A) | 9 μm | With | 1 | Dark color | 1 (alcohol-based) | 148 | 648 |
| Example 5 | M8, half screwed | Acid zinc chloride bath (Company B) | 7 μm | With | 2 | Frosted | 1 (alcohol-based) | 260 | 1680 |
| Comparative Example 3 | M8, half screwed | Acid zinc chloride bath (Company B) | 7 μm | Without | | | 1 (alcohol-based) | 192 | 1704 |
| Example 6 | M8, half screwed | Alkaline zincate bath (Company C) | 10 μm | With | 3 | Frosted | 1 (alcohol-based) | 240 | 1200 |
| Comparative Example 4 | M8, half screwed | Alkaline zincate bath (Company C) | 10 μm | Without | | | 1 (alcohol-based) | 168 | 1704 |
| Example 7 | M8, half screwed | Alkaline zincate bath | 10 μm | With | 3 | Frosted | 1 (alcohol-based) | 216 | 1104 |
| Comparative Example 5 | M8, half screwed | Alkaline zincate bath | 10 μm | Without | | | 1 (alcohol-based) | 192 | 1128 |
| Example 8 | Small screw | Alkaline zincate bath | 7 μm | With | 3 | Frosted | 1 (alcohol-based) | 168 | 504 |
| Comparative Example 6 | Small screw | Alkaline zincate bath | 7 μm | Without | | | 1 (alcohol-based) | 124 | 552 |
| Example 9 | Small screw | Acid zinc chloride bath (Company D) | 5 μm | With | 3 | Frosted | 1 (alcohol-based) | 168 | 216 |
| Comparative Example 7 | Small screw | Acid zinc chloride bath (Company D) | 5 μm | Without | | | 1 (alcohol-based) | 24 | 144 |
| Example 10 | M8, half screwed | Alkaline zincate bath (Company C) | 10 μm | With | 3 | Frosted | 2 (mixed) | 120 | 1176 |
| Comparative Example 8 | M8, half screwed | Alkaline zincate bath (Company C) | 10 μm | Without | | | 2 (mixed) | 24 | 1200 |
| Comparative Example 9 | M8, half screwed | Alkaline zincate bath (Company C) | 10 μm | With | 3 | Frosted | 3 (water-based) | 24 | 1128 |
| Comparative Example 10 | M8, half screwed | Alkaline zincate bath (Company C) | 10 μm | Without | | | 3 (water-based) | 24 | 1152 |
| Example 11 | Diecast zinc alloy part | | | With | 3 | Frosted | 1 (alcohol-based) | 432 | |
| Comparative Example 11 | Diecast zinc alloy part | | | Without | | | 1 (alcohol-based) | 192 | |

SST: Abbreviation for salt spray test

EXAMPLES 12 TO 15 AND COMPARATIVE EXAMPLES 12 TO 15

Steel sheets galvanized in an alkaline zincate bath (size: 50 mm×50 mm×2 mm, plating thickness: 8 μm) by Company E and steel sheets galvanized in an acid zinc chloride bath (size: 50 mm×50 mm×2 mm, plating thickness: 7 μm) by Company F were procured. From the steel sheets galvanized in the alkaline zincate bath, samples (EXAMPLE 12) treated with conversion coating in Chromium-free conversion coating liquid 3 and samples (COMPARATIVE EXAMPLE 12) not treated with conversion coating were prepared. Also, from the steel sheets galvanized in the acid zinc chloride bath, samples (EXAMPLE 13) treated with conversion coating in Chromium-free conversion coating liquid 3 and samples (COMPARATIVE EXAMPLE 13) not treated with conversion coating were prepared.

Solution 1 of a chromium-free surface treatment agent which uses an alcohol solvent was applied by the dip spin coating method to these samples of EXAMPLES 12 and 13 and of COMPARATIVE EXAMPLES 12 and 13 and baked at 130° C. Some of each of EXAMPLES 12 and 13 and of COMPARATIVE EXAMPLES 12 and 13 were put in a light-exposure test apparatus based on JASO M346. The light-exposed samples from EXAMPLES 12 and 13, which had been subjected to the conversion treating with Chromium-free conversion coating liquid 3, are referred to as samples of EXAMPLES 14 and 15, respectively. The light-exposed samples from COMPARATIVE EXAMPLES 12 and 13, which had not been subjected to the conversion treating with Chromium-free conversion coating liquid 3, are referred to as samples of COMPARATIVE EXAMPLES 14 and 15, respectively.

The samples, which had been subjected to the light-exposure test and those which had not been subjected to the light-exposure test, were simultaneously put in the salt spray test apparatus based on JIS Z 2371 and their rust inhibitive performance was evaluated. The results are shown in TABLE 5. From the results of TABLE 5, it is apparent that on the samples to which the surface treatment agent and conversion coating had been applied, the deterioration of rust inhibitive performance against the formation of white rusting by the light-exposure test is small.

TABLE 5

| | Test piece | Galvanizing bath | Plating thickness | Pre-treatment | Chromium-free conversion coating liquid | Appearance | Solution of chromium-free surface treatment agent | Time to rusting in SST White rusting (hours) | Red rusting (hours) |
|---|---|---|---|---|---|---|---|---|---|
| Example 12 | Small square sheet | Alkaline zincate bath (Company E) | 7 μm | With | 3 | Frosted | 1 (alcohol-based) | 170 | 860 |
| Comparative Example 12 | Small square sheet | Alkaline zincate bath (Company E) | 7 μm | Without | | | 1 (alcohol-based) | 24 | 600 |
| Example 13 | Small square sheet | Acid zinc chloride bath (Company F) | 6 μm | With | 3 | Frosted | 1 (alcohol-based) | 120 | 410 |
| Comparative Example 13 | Small square sheet | Acid zinc chloride bath (Company F) | 6 μm | Without | | | 1 (alcohol-based) | 24 | 410 |
| Example 14* | Small square sheet | Alkaline zincate bath (Company E) | 7 μm | With | 3 | Frosted | 1 (alcohol-based) | 216 | 1368 |
| Comparative Example 14* | Small square sheet | Alkaline zincate bath (Company E) | 7 μm | Without | | | 1 (alcohol-based) | 192 | 1440 |
| Example 15* | Small square sheet | Acid zinc chloride bath (Company F) | 6 μm | With | 3 | Frosted | 1 (alcohol-based) | 144 | 408 |
| Comparative Example 15* | Small square sheet | Acid zinc chloride bath (Company F) | 6 μm | Without | | | 1 (alcohol-based) | 120 | 432 |

*Test piece not subjected to the light-exposure test

Incidentally, the test in accordance with JASO M346 is an accelerated light-exposure test method utilizing a xenon-arc lamp (an artificial light source akin to solar light), which is applied for evaluations of automotive interior parts. In the test method, radiant exposure is performed so that the accumulated quantity of radiated light in the wavelength range of 300 to 400 nm becomes 100 MJ/m$^2$ in an atmosphere in which the temperature is kept at 89±3° C. and the humidity is kept as 50±5%.

EXAMPLE 16 AND COMPARATIVE EXAMPLE 16

A citric-acid-based Chromium-free conversion coating liquid 4 shown in TABLE 6 was prepared by dissolving 1 g of citric acid, 30 g (6 g as an amount converted to silica) of aqueous silica sol (SNOWTEX-O made by Nissan Chemical Industries, Ltd.) and 3 g of zinc chloride (1.44 g as an amount converted to zinc) in 1 liter of ion exchanged pure water.

TABLE 6

| | Chromium-free conversion coating liquid 4 |
|---|---|
| Citric acid | 1.0 g/l |
| Aqueous silica sol* | 30 g/l (6 g/l when converted to SiO$_2$) |
| ZnCl$_2$ | 3.0 g/l (1.44 g/l when converted to Zn) |
| Water | Balance |

*SNOWTEX-O made by Nissan Chemical Industries, Ltd. was used.

The alkaline zincate galvanizing bath manufactured by Dipsol Chemicals Co., Ltd. was prepared in a small barrel plating apparatus having a barrel capacity of about 1.6 liters, 1.14 kg of M3 screws (length of threaded portion: 8 mm) were put in the barrel of the plating apparatus, plating was performed so that the average plating current density became 0.8 to 1.0 A/dm$^2$, a plating current was applied for about 40 minutes while the barrel was being rotated at 10 RPM, and after rinsing and drying, M3 screws having a plating thickness of about 9.5 μm were obtained.

When these galvanized M3 screws were subjected to baking treatment which prevents hydrogen embrittlement (heating at 200° C. for 4 hours), the M3 screws colored yellow. When these colored screws were immersed in the above-described Chromium-free conversion coating liquid 4 held at 25° C. for 10 seconds and dried after rinsing, the yellow color could be removed. Solution 1 of a chromium-free surface treatment agent which uses an alcohol solvent was applied by the dip spin coating method to the screws treated with the conversion coating (EXAMPLE 16) and to the screws not treated with the conversion coating (which had colored yellow) (COMPARATIVE EXAMPLE 16) and these screws were baked at 120° C. for 10 minutes.

Ten screws of EXAMPLE 16 and ten screws of COMPARATIVE EXAMPLE 16 were put in the salt spray test apparatus based on JIS Z 2371 and their rust inhibitive performance was evaluated. The results are shown in TABLE 7. From the results of TABLE 7, it becomes apparent that although the effect of the conversion coating on an improvement in rust inhibitive performance is small, the yellow color appeared due to baking can be removed without causing the surface to be frosted by the conversion coating.

TABLE 7

| | Test piece | Galvanizing bath | Plating thickness | Baking 200° C. | Chromium-free conversion coating liquid | Appearance | Solution of chromium-free surface treatment agent | Time to rusting in SST White rusting (hours) | Red rusting (hours) |
|---|---|---|---|---|---|---|---|---|---|
| Example 16 | M3 small screw | Alkaline zincate bath | 9.5 μm | With | 4 | Good | 1 (alcohol-based) | 168 | — |
| Comparative Example 16 | M3 small screw | Alkaline zincate bath | 9.5 μm | With | | Yellow | 1 (alcohol-based) | 144 | — |

TABLE 7-continued

| | Test piece | Galvanizing bath | Plating thickness | Baking 200° C. | Chromium-free conversion coating liquid | Appearance | Solution of chromium-free surface treatment agent | Time to rusting in SST White rusting (hours) | Time to rusting in SST Red rusting (hours) |
|---|---|---|---|---|---|---|---|---|---|
| Example 17 | M2.6 small screw | Alkaline zincate bath | 9.5 μm | With | 4 | Good | 4 (alcohol-based) | 144 | — |
| Comparative Example 17 | M2.6 small screw | Alkaline zincate bath | 9.5 μm | With | | Yellow | 4 (alcohol-based) | 24 | — |

EXAMPLE 17 AND COMPARATIVE EXAMPLE 17

In the same manner as in EXAMPLE 16, M2.6 screws which had been galvanized in the alkaline zincate galvanizing bath manufactured by Dipsol Chemicals Co., Ltd. (length of threaded portion: 14 mm, plating thickness: 9.5 μm) were subjected to baking treatment (heating at 200° C. for 4 hours) and then subjected to pickling treatment to decolorize the yellow color which involves immersing the bolts in a diluted nitric acid with concentration of 0.2%. Screws which were rinsed and dried after the pickling treatment (COMPARATIVE EXAMPLE 17) and screws which were immersed in Chromium-free conversion coating liquid 4 held at 25° C. for 10 seconds after the pickling treatment and then dried (EXAMPLE 17) were prepared. Solution 4 of a chromium-free surface treatment agent was applied by the dip spin coating method to both the screws of COMPARATIVE EXAMPLE 17 and the screws of EXAMPLE 17. Five screws of EXAMPLE 17 and five screws of COMPARATIVE EXAMPLE 17 were put in the salt spray test apparatus based on JIS Z 2371 and their rust preventive performance was evaluated. As a result, white rusting was observed in 144 hours on 2 out of the 5 screws of EXAMPLE 17, whereas white rusting was observed in 24 hours on 3 out of the 5 screws of COMPARATIVE EXAMPLE 17. The results of the salt spray test are also shown in TABLE 7.

It became apparent that in galvanized metal products subjected to baking and pickling treatment, which involves washing with a diluted nitric acid, rust inhibitive performance is scarcely improved even when Chromium-free conversion coating liquid 1 or 4 which uses an alcohol solvent is applied, whereas when Chromium-free conversion coating liquid 1 or 4 is applied after conversion coating with the above-described citric-acid-based Chromium-free conversion coating liquid 4, it is possible to impart rust inhibitive performance of practical level without causing the surface to be frosted.

What is claimed is:

1. A chromium-free rust inhibitive treatment method for a metal product having a zinc surface comprising:
    coating the zinc surface of the metal product with an aqueous chromium-free conversion coating liquid to form a conversion-coated film on the zinc surface and
    applying a solution of a chromium-free surface treatment agent to the surface coated with the conversion coated film to form a siliceous film having an average thickness of 0.5 to 3 μm on the surface coated with the conversion coated film, the solution of the chromium-free surface treatment agent being alkoxysilane oligomer in an alcohol solvent and containing a component that changes into silica of 10 to 25% by weight as an amount converted to silica,
    wherein the alkoxysilane oligomer has been prepared by hydrolysis and condensation polymerization of tetraalkoxysilane together with acid catalyst, and the weight averaged molecular weight of the alkoxysilane oligomer is 1000 to 10000.

2. The chromium-free rust inhibitive treatment method for a metal product having a zinc surface according to claim 1, wherein the solution of the chromium-free surface treatment agent contains 0.3 to 2% by weight of a dispersion-treated nano-sized powder of titanium oxide having an average primary particle size of not more than 40 nm.

3. The chromium-free rust inhibitive treatment method for a metal product having a zinc surface according to claim 1, wherein the solution of the chromium-free surface treatment agent contains 4 to 16% by weight of a silane coupling agent.

4. The chromium-free rust inhibitive treatment method for a metal product having a zinc surface according to claim 1, wherein the aqueous chromium-free conversion coating liquid contains zinc phosphate.

5. The chromium-free rust inhibitive treatment method for a metal product having a zinc surface according to claim 1, wherein the metal product having the zinc surface is a galvanized metal product or a zinc alloy plated metal product or a cast zinc alloy product as a base component.

6. The chromium-free rust inhibitive treatment method for a metal product having a zinc surface according to claim 5, wherein the metal product is a small screw having a threaded portion with an outside diameter of not more than 3 mm, the small screw electrogalvanized by a barrel method.

* * * * *